United States Patent [19]

Whittle et al.

[11] 4,117,522
[45] Sep. 26, 1978

[54] ISTHMIAN PRECISION ADJUSTABLE MOUNT FOR MAGNET HEAD ASSEMBLY

[75] Inventors: William C. Whittle, LaVerne; Joel E. Zneimer, Arcadia, both of Calif.

[73] Assignee: Bell & Howell Company, Chicago, Ill.

[21] Appl. No.: 759,926

[22] Filed: Jan. 17, 1977

[51] Int. Cl.² .............................................. G11B 21/24
[52] U.S. Cl. .................................................... 360/109
[58] Field of Search .......................................... 360/109

[56] References Cited

U.S. PATENT DOCUMENTS

| | | | |
|---|---|---|---|
| 3,502,820 | 3/1970 | Zenz | 360/109 |
| 3,679,838 | 7/1972 | Salcedo et al. | 360/109 |
| 4,038,694 | 7/1977 | Leshik | 360/109 |

FOREIGN PATENT DOCUMENTS 2,362,094   6/1975   Fed. Rep. of Germany .......... 360/109

*Primary Examiner*—Robert S. Tupper
*Attorney, Agent, or Firm*—Benoit Law Corporation

[57] ABSTRACT

Methods and apparatus for mounting a device and adjusting its position employ a mount for the device and provide spaced isthmi located on a predetermined axis. The portion of the mount between the spaced isthmi is rendered tiltable about the mentioned axis. The device is mounted on the tiltable portion and its position is adjustable by tilting such portion about the mentioned axis.

54 Claims, 5 Drawing Figures

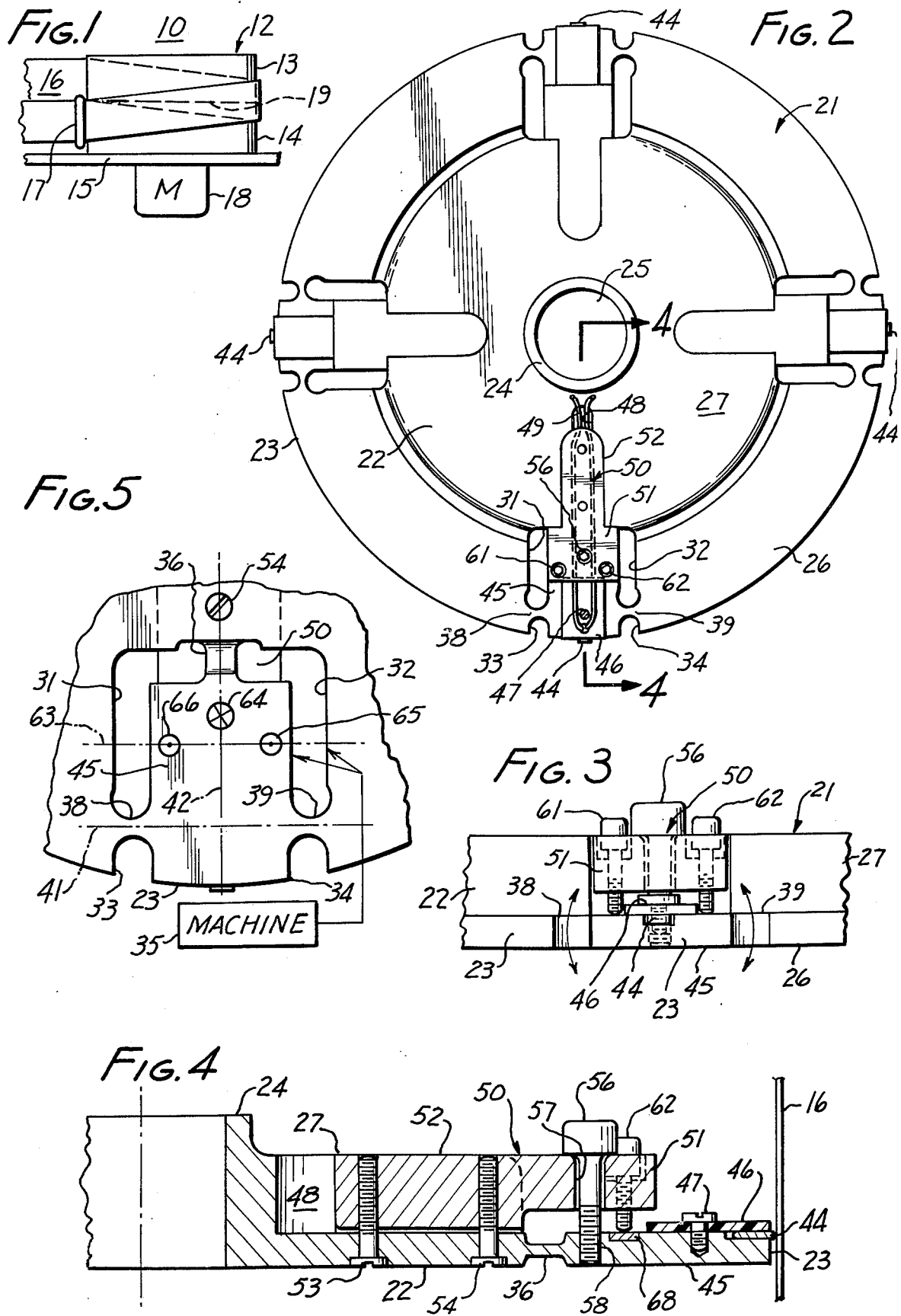

ISTHMIAN PRECISION ADJUSTABLE MOUNT FOR MAGNET HEAD ASSEMBLY

BACKGROUND OF THE INVENTION

1. Field of the Invention

The subject invention relates to methods and apparatus for mounting a device and adjusting its position, to isthmian precision mounts, to apparatus and methods for mounting magnetic heads, especially for video signal recording and playback equipment or magnetic tape recording and playback apparatus, and to rotary magnetic head assemblies.

2. Description of Prior Art

A large variety of methods and apparatus for mounting a device and adjusting its position have become known over the years. The quest for such methods and apparatus has become intensified with the advent of magnetic tape recording and other techniques wherein the precise adjustment of a recording and/or playback head can be extremely important for an accurate and faithful recording and reproduction of information.

By way of example, reference may be had to the following patents dealing with magnetic head positional adjustments and being herewith incorporated by reference herein: U.S. Pat. No. 2,678,971, by E. Barany, issued May 18, 1954, U.S. Pat. No. 2,897,288, by J. Wijchman, issued July 28, 1959, U.S. Pat. No. 3,455,559, by R. C. Wilson, issued July 15, 1969, U.S. Pat. No. 3,539,191, by Kozo Yamamoto, issued Nov. 10, 1970, and U.S. Pat. No. 3,679,841, by Herger et al., issued July 25, 1972.

The head adjustment precision attainable by these prior-art devices was necessarily limited by their nature.

Higher precision for such high-quality applications as instrumentation tape recording is attainable with the azimuth adjustment and magnetic head mounting technique and structure disclosed in U.S. Pat. No. 3,794,769, by J. J. Neff, issued Feb. 26, 1974, and herewith incorporated by reference herein. Briefly, the azimuth adjustment for magnetic recording heads and other devices according to that patent has a rotatable member with an inclined surface relative to an axis of rotation. A mount for the recording head or other device has a pair of spaced cam followers which are yieldably applied to the inclined surface of the rotatable member. The mount further has a resilient portion which is typically of a reduced or restricted design. To effect azimuth adjustments, the rotatable member is rotated whereby the mount is selectively twisted.

While the latter prior-art device has been and still is very successful in practice, it, too, has its limitations. For instance, that prior-art device has not so far been applied to rotating magnetic recording heads.

In this respect, reference may be had to U.S. Pat. No. 2,773,120, by E. E. Masterson, issued Dec. 4, 1956 and showing an early version of the now widely used rotating magnetic head disk and associated drum structure about which magnetic recording tape is wrapped in order to record magnetic video information and other high frequency signals in a slant track pattern. Another well-known video recording technique in which rotating magnetic heads are used is the transverse-scan method in which the heads rotate in a plane extending perpendicularly to the advancing magnetic recording tape.

In the practice of these techniques, precise elevational and azimuth adjustment of the rotatable heads can become very important to the accuracy and fidelity of the recorded information, as well as to its faithful reproduction.

In connection with the more general scope of the subject invention, reference may, for instance, be had to U.S. Pat. No. 1,676,114, by W. J. Rusdell, issued July 3, 1928, and U.S. Pat. No. 2,294,437, by C. E. Allen et al., issued Sept. 1, 1942, and showing tilting head devices. In practice, those structures would be far too complex for the purposes herein contemplated and, in the case of rotating recording and playback devices, too bulky and of insufficient inherent accuracy.

SUMMARY OF THE INVENTION

It is a general object of this invention to overcome the above mentioned disadvantages.

It is a related object of this invention to provide improved methods and apparatus for mounting devices and adjusting their position.

It is a germane object of this invention to provide improved methods and apparatus for mounting magnetic recording heads and other information recording devices and for effecting adjustments, such as elevation and azimuth adjustments, in their position.

It is also an object of this invention to provide improved magnetic head assemblies with precision azimuth and elevation adjustment features.

It is a related object of this invention to provide improved magnetic head wheel or disk assemblies with precision azimuth and elevation adjustments of the individual heads.

Other objects will become apparent in the further course of this disclosure.

From a first aspect thereof, the subject invention resides in a method of mounting a device and adjusting the position of said device, comprising in combination the steps of providing a mount for said device, providing said mount with spaced first and second isthmi located on a predetermined axis, rendering the portion of said mount between said spaced isthmi tiltable about said axis, mounting said device on said tiltable portion, and adjusting the position of said device by tilting said portion about said axis.

From another aspect thereof, the subject invention resides in a method of mounting a device and adjusting the position of that device, comprising in combination the steps of providing a mount for said device, providing said mount with spaced first and second isthmi, mounting said device on the portion of said mount between said first and second isthmi, and adjusting the position of said device by straining said isthmi.

From another aspect thereof, the subject invention resides in a method of mounting a device and adjusting the position of that device, comprising in combination the steps of providing a mount for said device, providing said mount with spaced first and second isthmi located on a predetermined first axis, and with a third isthmus located laterally of said first axis, rendering the portion of said mount between said first, second and third isthmi tiltable about said first axis, mounting said device on said tiltable portion; adjusting the position of said device by tilting said portion about said first axis, and further adjusting the position of said device by tilting said portion about a second axis extending through said third isthmus and extending at an angle to said first axis.

From another aspect thereof, the subject invention resides in a method of mounting a device and adjusting the position of that device, comprising in combination the steps of providing a mount for said device, providing said mount with spaced first, second and third isthmi, mounting said device on the portion of said mount between said first, second and third isthmi, and adjusting the position of said device by straining said isthmi.

From another aspect thereof, the subject invention resides in a method of mounting a device and of adjusting the elevation and azimuth of said device, comprising in combination the steps of providing a mount for said device having an edge, providing said mount with a first isthmus at a distance from said edge and with spaced second and third isthmi located closer to said edge than said first isthmus and having a portion of said mount connected to said third isthmus located therebetween, mounting said device on said portion, adjusting the elevation of said device by tilting said portion about a first axis extending through said second and third isthmi, and adjusting the azimuth of said device by tilting said portion about a second axis extending through said first istmus and at an angle to said first axis.

From another aspect thereof, the subject invention resides in apparatus for mounting a device and adjusting the position of that device, comprising, in combination, a mount for said device having spaced first and second isthmi located on a predetermined axis and having a tiltable portion of said mount located therebetween, means for mounting said device on said tiltable portion, and means for adjusting the position of said device including means coupled to said portion for tilting said portion about said axis.

From another aspect thereof, the subject invention resides in apparatus for mounting a device and adjusting the position of that device, comprising, in combination, a mount for said device having spaced first and second isthmi and having a portion of said mount located therebetween, means for mounting said device on said portion of the mount between said first and second isthmi, and means coupled to said portion for adjusting the position of said device, including means for straining said isthmi.

From another aspect thereof, the subject invention resides in apparatus for mounting a device and adjusting the position of that device, comprising, in combination, a mount for said device having spaced first and second isthmi located on a predetermined first axis, a third isthmus located laterally of said first axis, and a tiltable portion of said mount located between said first, second and third isthmi, means for mounting said device on said tiltable portion, means coupled to said portion for adjusting the position of said device, including means for tilting said portion about said first axis and for further adjusting the position of said device by tilting said portion about a second axis extending through said third istmus and extending at an angle to said first axis.

From another aspect thereof, the subject invention resides in apparatus for mounting a device and adjusting the position of that device, comprising, in combination, a mount for said device having spaced first, second and third isthmi, means for mounting said device on a portion of said mount between said first, second and third isthmi, and means coupled to said portion for adjusting the position of said device, including means for straining said isthmi.

From another aspect thereof, the subject invention resides in apparatus for mounting a device and of adjusting the elevation and azimuth of that device, comprising, in combination, a mount for said device having an edge, a first isthmus at a distance from said edge, and spaced second and third isthmi located closer to said edge than said first isthmus and having a portion of said mount connected to said third isthmus located therebetween, means for mounting said device on said portion, means coupled to said portion for adjusting the elevation of said device by tilting said portion about a first axis extending through said second and third isthmi and for adjusting the azimuth of said device by tilting said portion about a second axis extending through said first isthmus and at an angle to said first axis.

From another aspect thereof, the subject invention resides in apparatus for mounting a magnetic head comprising, in combination, a head wheel having a circular edge, means for mounting said head wheel for rotation, a first isthmus in said wheel located on a radius of said wheel at a distance from said edge, spaced second and third isthmi located closer to said edge than said first isthmus and having a portion of said wheel connected to said third isthmus located therebetween, means for mounting said magnetic head on said portion at said edge, means coupled to said portion for adjusting the elevation of said head by tilting said portion about a first axis extending through said second and third isthmi, and for adjusting the azimuth of said device by tilting said portion about a second axis extending through said first isthmus and at an angle to said first axis.

BRIEF DESCRIPTION OF THE DRAWINGS

The subject invention and its various aspects and objects will become more readily apparent from the following detailed description of preferred embodiments thereof, illustrated by way of example in the accompanying drawings in which like reference numerals designate like or functionally equivalent parts, and in which:

FIG. 1 is an elevation of head drum equipment of a slant track magnetic tape recorder;

FIG. 2 is a plan view of a rotating magnetic head assembly in accordance with a preferred embodiment of the subject invention and usable in the apparatus of FIG. 1;

FIG. 3 is a fractional front view, on an enlarged scale, of the assembly of FIG. 2;

FIG. 4 is a section along the line 4—4 in FIG. 2; and

FIG. 5 is a fractional rear view, on an enlarged scale, of the assembly of FIG. 2.

DESCRIPTION OF PREFERRED EMBODIMENTS

The magnetic slant track recording equipment 10 shown in FIG. 1, in similarity to the recording apparatus disclosed in the above mentioned Masterson patent, has a head drum 12 composed of two halves 13 and 14 and mounted on a base 15. Magnetic recording tape 16 is wrapped and driven about the head drum 12 in a slanted manner by equipment including a tape quiding pin 17.

In practice, a magnetic head disk or wheel is rotated by a motor 18 and carries one or more magnetic recording and/or playback heads, as required, along a slot between the head drum halves 13 and 14, as indicated at 19 in FIG. 1.

A head disk or wheel assembly 21 according to a preferred embodiment of the subject invention and useful in the apparatus illustrated in FIG. 1 or in other applications in which rotating head assemblies are required, is shown in FIG. 2.

In particular, the assembly of FIG. 2 comprises a head wheel 22 having a circular edge or periphery 23. The wheel 22 has a central hub 24 by means of which the wheel may be mounted on a shaft 25 of the head drive motor 18.

In the illustrated preferred embodiment, the wheel has a flange or rim 26 defining the circular edge 23, as well as a raised hub portion 27 carrying the rim 26. In practice, the hub portion 27 may be provided by giving the wheel a larger thickness at 27 than at 26.

The wheel 22 may be made of metal or other suitable material. If the wheel is made of a machinable or castable metal or other substance, a series or pattern of slots and notches 31 to 34 may be machined or cast into the wheel structure for each recording head. Alternatively, other techniques may be employed for forming the slots and notches 31 to 34 depending on the material of which the wheel is formed. In the further course of this disclosure, such techniques will be summarized by the expression "machining" as indicated at 35 in FIG. 5.

The angled slots 31 and 32 are cut or formed to provide a first isthmus or reduced cross-section flexible beam 36 on a radius of the wheel at a distance from its circular edge 23. As best apparent in FIG. 4, the isthmus 36 may also be of restricted cross-section in an axial direction of the wheel. This option applies also to the other isthmi herein shown.

The slots and notches 31 to 34 are further formed to provide second and third isthmi 38 and 39 located closer to the edge 23 than the first isthmus 36. In the illustrated preferred embodiment, the isthmi 38 and 39 are located on an axis 41 extending at right angles to a radius 42 of the wheel. Expressed in other words, the axis 41 is a secant extending parallel to a tangent touching the periphery of the wheel at the location of a magnetic recording head 44.

The isthmi 38 and 39 have a portion 45 of the wheel 22 located therebetween. The wheel portion 45 is also connected to the isthmus 36.

In other words, a portion 45 of the wheel having an edge 23 is located between the isthmi 36, 38 and 39.

The magnetic recording or video head 44 is located on an assembly plate 46 which, in turn, is mounted on the tiltable wheel portion 45 by suitable fasteners including, for instance, a screw 47. A cavity 48 may be provided in the wheel to accommodate electric wires 49 connecting the head winding to a rotating transformer or other conventional equipment (not shown) for transmitting electric signals to and from the head 44.

A cantilever 50 has a first part 51 overhanging the tiltable wheel portion 45 and a second part 52 attached to the remainder of the wheel 22 by screws 53 and 54 or other suitable fasteners. In the illustrated preferred embodiment, the cantilever part 52 is smaller than the projecting cantilever part 51 and is accommodated in a correspondingly machined slot in the wheel structure. The cantilever 50 is of steel or another rigid material.

The devices for applying the requisite forces to the tiltable wheel portion 45 are mounted on the projecting cantilever portion 51.

In the illustrated preferred embodiment, the means for adjusting the elevation of the head 44 relative to the tape 16 or head drum 12 include an Allen head screw 56 which extends through a bore 57 in the projecting cantilever part 51 and which is threaded into the movable wheel portion 45 as shown at 58.

The means for adjusting the azimuth of the head 44 include in the illustrated preferred embodiment of the invention two Allen head screws 61 and 62 which are symmetrically disposed relative to the screw 56 or relative to the wheel radius 42 through the isthmus 36.

In the illustrated preferred embodiment, the screws 61 and 62 are threaded into tapped holes in the projecting cantilever beam 51. Also in the illustrated preferred embodiment, the screws 61 and 62 contact the tiltable wheel portion 45 on an axis 63 extending in parallel to the isthmus axis 41 or at right angles to the wheel radius 42, and being located between the screw 56 and the isthmus axis 41.

In this manner, the azimuth adjustment screws 61 and 62 also serve as pivot points for the elevational head adjustment carried out by rotation of the screw 56.

On the other hand, the elevation adjustment screw 56, by its being threaded into the wheel portion 45, acts as a reference point for the azimuth adjustment by the screws 61 and 62.

Three force vectors, presently to be described in greater detail, are shown in FIG. 5 to illustrate the mechanism of head elevation and azimuth adjustment in the head wheel assembly 21. In viewing FIG. 5, it should be kept in mind that the same shows a partial rear view of the wheel structure.

The vectors 64, 65 and 66 correspond to the adjustment screws 56, 61 and 62, respectively.

A force of the type symbolized by the vector 64 may be applied to the wheel portion 45 by tightening the screw 56 so that the part of the wheel portion adjacent the screw at 58 is pulled toward the cantilever beam 51. In that case, the isthmus 36 is flexed or elongated and the isthmi 38 and 39 are flexed or tortioned about the axis 41, whereby the wheel portion 45 tilts about the pivot provided by the tips of the screws 61 and 62 and the elevation of the head 44 is adjusted downwardly.

In practice, the isthmi are preferably not stressed beyond their elastic limit, so that the elevation of the head 44 may be adjusted upwardly by a relaxation of the screw 56, whereby the part of the wheel portion 45 at 58 will move away from the cantilever beam 51. Additionally, the screws 61 and 62 may to some extent be employed in the head elevation adjustment as they provide pivot points for the screw 56.

To effect azimuth adjustment, the wheel portion 45 is tilted about the axis or wheel radius 42 whereby the isthmus 36 is torsioned or twisted while the isthmi 38 and 39 are elongated or flexed. For instance, the azimuth of the head 44 is varied in a first sense by tightening of the screw 61, with the resulting force being symbolized by the vector 65. Alternatively, the azimuth of the head 44 is adjusted in an opposite second sense by tightening of the screw 62, with the resulting force being symbolized by the vector 66.

In either case, a force couplet is actually brought to bear on the tiltable wheel portion 45, with a first component of that couplet being applied on the axis or wheel radius 42 by the screw 56 being threaded into the wheel portion 45 at 58. A second component of that couplet is then provided by either screw 61 and 62, depending on the desired sense of the azimuth adjustment. In this respect, either one of the screws 61 and 62 may be loosened while the other may be tightened for a desired azimuth adjustment.

As is also apparent from FIG. 5 with respect to the illustrated preferred embodiment, any of the forces symbolized by the vectors 64 to 66 is applied laterally of the isthmus axis 41. The wheel rim portion 45 may be provided with hardened inserts 68 at the points of contact of the tips of screws 61 and 62 for improved acceptance of high screwpoint loads, inhibition of deformation of material at the head wheel portion 45, and increase of stability of the screw setting. The inserts 68 may be of hardened steel or another hardened material and may be flat or cylindrical as shown in FIG. 4 or then spherical, being located in a recess or bore in the head wheel portion Similarly, the forces symbolized by the vectors 65 and 66 are applied laterally of the isthmus axis or wheel radius 42. On the other hand, the force symbolized by the vector 64 is applied on the isthmus axis or wheel radius 42 itself. The position of the device or head 44 may thus be adjusted in a first sense by applying a first force 64 to the tiltable wheel portion or mount 45 laterally of the isthmus axis 41 to tilt that portion 45 about that axis 41. The position of the device or head 44 may be adjusted in a second sense by applying a second force 65 or 66 to the tiltable wheel portion or mount 45 laterally of the axis 41 and of the first force 64 to tilt the wheel portion or mount 45 about an axis or wheel radius 44 perpendicular to the axis on which the isthmi 38 and 39 are located.

It will thus be recognized that the position of the device is primarily adjusted by appropriately straining the isthmi 36, 38 and 39. Depending on the adjustment desired, at least two of the isthmi may be strained in the same sense or at least two of the isthmi may be strained in opposite senses.

Variations and modifications within the spirit and scope of the subject invention will be suggested or rendered apparent by the present extensive disclosure to those skilled in the art.

Without limiting the generality of the foregoing, it will be recognized that the screw 56 could be threaded to the cantilever beam 51 and coupled to the tiltable wheel portion 45. Similarly, either or both of the screws 61 and 62 could be threaded in the movable wheel portion 45 and coupled to the cantilever beam 51. Also, more elaborate force applying devices than simple screws could be employed for adjusting the position of the tiltable wheel portion 45.

One or more, or a plurality of, heads 44 with associated tiltable portions 45, isthmi 36, 38, 39 and cantilever structures can be provided on the wheel 22 as indicated in FIG. 2.

The elevations and azimuths of the plurality of heads are, thereby, rendered individually adjustable.

Also, while the tiltable wheel or mount portion 45 is located between the isthmi 38 and 39, or 36, 38, 39, and the head or device 44 is mounted on that portion 45 located between these isthmi, this, as shown in FIGS. 2 to 5, does not necessarily mean that the device 44 is itself physically located between these isthmi. Rather, the device 44 may merely be mounted on the wheel or mount portion 45 that is at least in part located between the isthmi, but such device 44, as shown in FIGS. 2 to 5, may be located laterally of the isthmi. On the other hand, the device may be mounted on a region of the mount portion 45 which is situated directly between the isthmi 38 and 39 or 36, 38 and 39.

We claim:

1. A method of mounting a device and adjusting the position of said device, comprising in combination the steps of:
   providing a mount for said device;
   providing said mount with spaced first and second isthmi located on a predetermined axis;
   rendering the portion of said mount between said spaced isthmi tiltable about said axis;
   mounting said device on said tiltable portion; and
   adjusting the position of said device by tilting said portion about said axis.

2. A method as claimed in claim 1, wherein:
   the position of said device is adjusted by applying a force to said portion laterally of said axis to tilt said portion about said axis.

3. A method as claimed in claim 2, wherein:
   the position of said device is further adjusted by tilting said portion about an axis perpendicular to the axis on which said isthmi are located.

4. A method as claimed in claim 1, wherein:
   the position of said device is adjusted in a first sense by applying a first force to said portion laterally of said axis to tilt said portion about said axis; and
   the position of said device is adjusted in a second sense by applying a second force to said portion laterally of said axis and of said first force to tilt said portion about an axis perpendicular to the axis on which said isthmi are located.

5. A method as claimed in claim 1, wherein:
   the position of said device is adjusted in a first sense by applying a force to said portion laterally of said axis to tilt said portion about said axis; and
   the position of said device is adjusted in a second sense by applying a force couplet to said portion laterally of said axis to tilt said portion about an axis perpendicular to the axis on which said isthmi are located.

6. A method of mounting a device and adjusting the position of said device, comprising in combination the steps of:
   providing a mount for said device;
   providing said mount with spaced first and second isthmi;
   mounting said device on the portion of said mount between said first and second isthmi; and
   adjusting the position of said device by straining said isthmi.

7. A method as claimed in claim 6, wherein:
   said isthmi are strained in the same sense.

8. A method as claimed in claim 6, wherein:
   said isthmi are strained in opposite senses.

9. A method as claimed in claim 6, wherein:
   said isthmi are strained in the same sense to adjust the position of said device in a first sense; and
   said isthmi are strained in opposite senses to adjust the position of said device in a second sense different from said first sense.

10. A method of mounting a device and adjusting the position of said device, comprising in combination the steps of:
    providing a mount for said device;
    providing said mount with spaced first and second isthmi located on a predetermined first axis, and with a third isthmus located laterally of said first axis;
    rendering the portion of said mount between said first, second and third isthmi tiltable about said first axis;
    mounting said device on said tiltable portion;
    adjusting the position of said device by tilting said portion about said first axis; and further adjusting the position of said device by tilting said portion about a second axis extending through said third isthmus and extending at an angle to said first axis.

11. A method as claimed in claim 10, wherein:
the position of said device is adjusted by applying a force to said portion laterally of said first axis and on said second axis to tilt said portion about said first axis.

12. A method as claimed in claim 10, wherein:
the position of said device is further adjusted by applying a force to said portion laterally of said first and second axes.

13. A method as claimed in claim 10, wherein:
the position of said device is adjusted by applying a first force to said portion laterally of said first axis and on said second axis to tilt said portion about said first axis; and
the position of said device is further adjusted by applying a second force to said portion laterally of said first and second axes.

14. A method as claimed in claim 10, wherein:
the position of said device is adjusted by applying a first force to said portion laterally of said first axis and on said second axis to tilt said portion about said first axis; and
the position of said device is further adjusted by applying to said portion a force couplet having a first component located on said second axis and a second component laterally of said second axis.

15. A method of mounting a device and adjusting the position of said device, comprising in combination the steps of:
providing a mount for said device;
providing said mount with spaced first, second and third isthmi;
mounting said device on a portion of said mount between said first, second and third isthmi; and
adjusting the position of said device by straining said isthmi.

16. A method as claimed in claim 15, wherein:
two of said isthmi are strained in the same sense; and
the other of said isthmi is elongated.

17. A method as claimed in claim 15, wherein:
one of said isthmi is torsioned; and
at least one of the other two of said isthmi is elongated.

18. A method of mounting a device and of adjusting the elevation and azimuth of said device, comprising in combination the steps of:
providing a mount for said device having an edge;
providing said mount with a first isthmus at a distance from said edge and with spaced second and third isthmi located closer to said edge than said first isthmus and having a portion of said mount connected to said first isthmus located therebetween;
mounting said device on said portion;
adjusting the elevation of said device by tilting said portion about a first axis extending through said second and third isthmi; and
adjusting the azimuth of said device by tilting said portion about a second axis extending through said first isthmus and at an angle to said first axis.

19. A method as claimed in claim 18, wherein:
the elevation of said device is adjusted by applying a force to said portion on said second axis.

20. A method as claimed in claim 18, wherein:
the azimuth of said device is adjusted by applying a force to said portion between said first isthmus and at least one of said second and third isthmi.

21. A method as claimed in claim 18, wherein:
the elevation of said device is adjusted by applying a force to said portion on said second axis; and
the azimuth of said device is adjusted by applying to said portion a force couplet having a first component located on said second axis and a second component laterally of said second axis.

22. Apparatus for mounting a device and adjusting the position of said device, comprising in combination:
a mount for said device having spaced first and second isthmi located on a predetermined axis and having a tiltable portion of said mount located therebetween;
means for mounting said device on said tiltable portion; and
means for adjusting the position of said device including means coupled to said portion for tilting said portion about said axis.

23. Apparatus as claimed in claim 22, wherein:
said adjusting means includes means for applying a force to said portion laterally of said axis to tilt said portion about said axis.

24. Apparatus as claimed in claim 22, wherein:
said adjusting means includes means for tilting said portion about an axis perpendicular to the axis on which said isthmi are located.

25. Apparatus as claimed in claim 22, wherein:
said adjusting means include means for adjusting the position of said device in a first sense, including means for applying a first force to said portion laterally of said axis to tilt said portion about said axis; and
said adjusting means further include means for adjusting the position of said device in a second sense, including means for applying a second force to said portion laterally of said axis and of said first force to tilt said portion about an axis perpendicular to the axis on which said isthmi are located.

26. Apparatus as claimed in claim 22, wherein:
said adjusting means include means for adjusting the position of said device in a first sense by applying a force to said portion laterally of said axis to tilt said portion about said axis and for adjusting the position of said device in a second sense by applying a force couplet to said portion laterally of said axis to tilt said portion about an axis perpendicular to the axis on which said isthmi are located.

27. Apparatus for mounting a device and adjusting the position of said device, comprising in combination:
a mount for said device having spaced first and second isthmi and having a portion of said mount located therebetween;
means for mounting said device on said portion of the mount between said first and second isthmi; and
means coupled to said portion for adjusting the position of said device, including means for straining said isthmi.

28. Apparatus as claimed in claim 27, wherein:
said adjusting means include means for straining said isthmi in the same sense to adjust the position of said device in a first sense and for straining said isthmi in opposite senses to adjust the position of said device in a second sense different from said first sense.

29. Apparatus for mounting a device and adjusting the position of said device, comprising in combination:

a mount for said device having spaced first and second isthmi located on a predetermined first axis, a third isthmus located laterally of said first axis, and a tiltable portion of said mount located between said first, second and third isthmi;

means for mounting said device on said tiltable portion;

means coupled to said portion for adjusting the position of said device, including means for tilting said portion about said first axis and for further adjusting the position of said device by tilting said portion about a second axis extending through said third isthmus and extending at an angle to said first axis.

30. Apparatus as claimed in claim 29, wherein:

said adjusting means include means for applying a force to said portion laterally of said first axis and on said second axis to tilt said portion about said first axis.

31. Apparatus as claimed in claim 29, wherein:

said adjusting means include means for applying a force to said portion laterally of said first and second axes.

32. Apparatus as claimed in claim 29, wherein:

said adjusting means include means for applying a first force to said portion laterally of said first axis and on said second axis and for applying a second force to said portion laterally of said first and second axes.

33. Apparatus as claimed in claim 29, wherein:

said adjusting means include means for applying a first force to said portion laterally of said first axis and on said second axis and for applying to said portion a force couplet having a first component located on said second axis and a second component laterally of said second axis.

34. Apparatus for mounting a device and adjusting the position of said device, comprising in combination:

a mount for said device having spaced first, second and third isthmi;

means for mounting said device on a portion of said mount between said first, second and third isthmi; and means coupled to said portion for adjusting the position of said device, including means for straining said isthmi.

35. Apparatus as claimed in claim 34, wherein:

said adjusting means include means for selectively torsioning any of said isthmi.

36. Apparatus as claimed in claim 34, wherein:

said adjusting means include means for selectively elongating any of said isthmi.

37. Apparatus for mounting a device and of adjusting the elevation and azimuth of said device, comprising in combination:

a mount for said device having an edge, a first isthmus at a distance from said edge, and spaced second and third isthmi located closer to said edge than said first isthmi and having a portion of said mount connected to said third isthmus located therebetween;

means for mounting said device on said portion;

means coupled to said portion for adjusting the elevation of said device by tilting said portion about a first axis extending through said second and third isthmi and for adjusting the azimuth of said device by tilting said portion about a second axis extending through said first isthmus and at an angle to said first axis.

38. Apparatus as claimed in claim 37, wherein:

said adjusting means include means for applying a force to said portion on said second axis.

39. Apparatus as claimed in claim 37, wherein:

said adjusting means include means for applying a force to said portion between said first isthmus and at least one of said second and third isthmi.

40. Apparatus as claimed in claim 37, wherein:

said adjusting means include means for applying a force to said portion on said second axis and for applying to said portion a force couplet having a first component located on said second axis and a second component laterally of said second axis.

41. Apparatus for mounting a magnetic head comprising in combination:

a head wheel having a circular edge;

means for mounting said head wheel for rotation;

a first isthmus in said wheel located on a radius of said wheel at a distance from said edge;

spaced second and third isthmi located closer to said edge than said first isthmus and having a portion of said wheel connected to said third isthmus located therebetween;

means for mounting said magnetic head on said portion at said edge;

means coupled to said portion for adjusting the elevation of said head by tilting said portion about a first axis extending through said second and third isthmi, and for adjusting the azimuth of said device by tilting said portion about a second axis extending through said first isthmus and at an angle to said first axis.

42. Apparatus as claimed in claim 41, wherein:

said adjusting means include a cantilever having a first part overhanging said wheel portion and a second part attached to the remainder of said wheel, and means on said first part for applying a force to said wheel portion.

43. Apparatus as claimed in claim 42, wherein:

said force applying means include a screw coupled to said first part and to said wheel portion.

44. Apparatus as claimed in claim 42, wherein:

said force applying means include a screw threaded in one of said first part and said wheel portion and coupled to the other of said first part and said wheel portion.

45. Apparatus as claimed in claim 42, wherein:

said force applying means include a screw coupled to said first part and to said wheel portion at said second axis.

46. Apparatus as claimed in claim 42, wherein:

said force applying means include a first screw coupled to said first part and to said wheel portion at said second axis, and a second screw coupled to said first part and to said wheel portion laterally of said second axis.

47. Apparatus as claimed in claim 42, wherein:

said force applying means include a first screw threaded in one of said first part and said wheel portion and coupled to the other of said first part and said wheel portion, and a second screw threaded in one of said first part and said wheel portion and coupled to the other of said first part and said wheel portion laterally of said second axis.

48. Apparatus as claimed in claim 47, wherein:

said force applying means include a third screw threaded in one of said first part and said wheel portion and coupled to the other of said first part and said wheel portion, with said second and third screws being symmetrically disposed relative to said first screw.

49. Apparatus as claimed in claim 41, wherein:
said second axis is a radius of said wheel, and said first axis extends at right angles to said first axis.

50. Apparatus for mounting a magnetic head comprising in combination:
a head wheel having a circular edge;
means for mounting said head wheel for rotation;
a pair of spaced slots in said head wheel extending away from each other on either side of a radius of said wheel and laterally delimiting a first isthmus in said wheel located on a radius of said wheel at a distance from said edge, said pair of spaced slots extending further in mutually spaced relationship toward said circular edge and delimiting in the vicinity of said circular edge corresponding sides of spaced second and third isthmi located closer to said edge than said first isthmus and having a portion of said wheel located therebetween, said portion of said wheel being connected to the remainder of said wheel by said first, second and third isthmi;
means for mounting said magnetic head on said portion of said wheel at said edge;
means coupled to said portion of said wheel for adjusting the elevation of said head by tilting said portion about a first axis extending through said second and third isthmi, and for adjusting the azimuth of said device by tilting said portion about a second axis extending through said first isthmus and at an angle to said first axis.

51. Apparatus as claimed in claim 50, wherein:
said adjusting means include a cantilever having a first part overhanging said wheel portion and a second part attached to the remainder of said wheel, and means on said first part of applying a force to said wheel portion.

52. Apparatus for mounting a device and adjusting the position of said device, comprising in combination:
a mount for said device;
a pair of spaced slots in said mount laterally delimiting spaced first and second isthmi and laterally delimiting a tiltable portion of said mount located between said slots and said isthmi;
means for mounting said device on said tiltable portion; and
means for adjusting the position of said device including means coupled to said portion for tilting said portion about an axis through said first and second isthmi.

53. A method of mounting a device and of adjusting the elevation and azimuth of said device, comprising in combination the steps of:
providing a mount for said device having an edge;
forming in said mount a pair of spaced slots extending away from each other at a distance from said edge to leave a first isthmus between said pair of spaced slots, and approaching said edge at spaced locations to provide spaced second and third isthmi located closer to said edge than said first isthmus, said pair of slots and first, second and third isthmi delimiting a portion of said mount separated from the remainder of said mount by said pair of spaced slots;
mounting said device on said portion;
adjusting the elevation of said device by tilting said portion about a first axis extending through said second and third isthmi; and
adjusting the azimuth of said device by tilting said portion about a second axis extending through said first isthmus and at an angle to said first axis.

54. A method of mounting a device and adjusting the position of said device, comprising in combination the steps of:
providing a mount for said device;
rendering a portion of said mount tiltable relative to the remainder of said mount by forming slots in said mount at spaced locations whereby to leave spaced isthmi in said mount between which said portion is located and tiltable;
mounting said device on said tiltable portion; and
adjusting the position of said device by tilting said portion about said axis.

* * * * *